(12) United States Patent
Park

(10) Patent No.: US 10,290,161 B2
(45) Date of Patent: May 14, 2019

(54) INTEGRATED MEMBERSHIP MANAGEMENT METHOD

(71) Applicant: Hee Suck Park, Gyeonggi-do (KR)

(72) Inventor: Hee Suck Park, Gyeonggi-do (KR)

( * ) Notice: Subject to any disclaimer, the term of this patent is extended or adjusted under 35 U.S.C. 154(b) by 0 days.

(21) Appl. No.: 16/062,484

(22) PCT Filed: Nov. 9, 2016

(86) PCT No.: PCT/KR2016/012855
§ 371 (c)(1),
(2) Date: Jun. 14, 2018

(87) PCT Pub. No.: WO2017/119596
PCT Pub. Date: Jul. 13, 2017

(65) Prior Publication Data
US 2018/0365917 A1    Dec. 20, 2018

(30) Foreign Application Priority Data

Jan. 4, 2016    (KR) ........................ 10-2016-0000429

(51) Int. Cl.
*G06K 7/10* (2006.01)
*G06K 7/14* (2006.01)
(Continued)

(52) U.S. Cl.
CPC ....... *G07C 9/00103* (2013.01); *G06K 7/1095* (2013.01); *G06K 7/1413* (2013.01);
(Continued)

(58) Field of Classification Search
CPC .......... G06K 19/00; G06K 5/00; G07B 15/00; G06F 17/00
(Continued)

(56) References Cited

U.S. PATENT DOCUMENTS

| 2010/0114614 A1* | 5/2010 | Sharpe ................... G06Q 10/02 |
| | | 705/5 |
| 2014/0081882 A1* | 3/2014 | Govindaraman ...... G06Q 10/10 |
| | | 705/319 |

(Continued)

FOREIGN PATENT DOCUMENTS

| KR | 10-2002-0033139 | 5/2002 |
| KR | 10-2004-0010809 | 1/2004 |

(Continued)

OTHER PUBLICATIONS

International Search Report dated Mar. 13, 2017 for PCT/KR2016/012855.

*Primary Examiner* — Edwyn Labaze

(57) ABSTRACT

Disclosed is an integrated membership management method comprising: transmitting member information about at least one business to sign up, and unique information of a member for attendance check to the business received at a member terminal to a central management server; registering the member information and the unique information received at the central management server; generating an attendance check request including the unique information of the member and the attendance check information of a business selected by the member from among the at least one business at the member terminal or a business terminal, and transmitting the attendance check request to the central management server; and parsing the attendance check request received at the central management server same, performing member certification of the member using the unique information of the member, and performing attendance check certification of the member using the attendance check information.

2 Claims, 2 Drawing Sheets

(51) Int. Cl.
*G06K 19/06* (2006.01)
*G07C 9/00* (2006.01)
*G06Q 10/06* (2012.01)
*H04W 88/08* (2009.01)
*G06Q 30/02* (2012.01)
*G06Q 50/00* (2012.01)

(52) U.S. Cl.
CPC ............ *G06K 19/06* (2013.01); *G06Q 10/06* (2013.01); *G06Q 30/0282* (2013.01); *G06Q 50/01* (2013.01); *G07C 9/00119* (2013.01); *H04W 88/08* (2013.01)

(58) Field of Classification Search
USPC ................. 235/382, 375, 380, 487, 382.5
See application file for complete search history.

(56) References Cited

U.S. PATENT DOCUMENTS

| | | | | |
|---|---|---|---|---|
| 2016/0180325 | A1* | 6/2016 | Davis | G06Q 20/085 705/44 |
| 2016/0293025 | A1* | 10/2016 | Marr | G06Q 10/109 |
| 2017/0054832 | A1* | 2/2017 | Awad | H04L 67/42 |

FOREIGN PATENT DOCUMENTS

| | | |
|---|---|---|
| KR | 10-2013-0040471 | 4/2013 |
| KR | 10-2015-0112566 | 10/2015 |
| KR | 10-1561299 | 10/2015 |
| KR | 10-2015-0133055 | 11/2015 |

\* cited by examiner

INTEGRATED MEMBERSHIP MANAGEMENT METHOD

This application claims the priority of Korean Patent Application No. 10-2016-0000429, filed on Jan. 4, 2016 in the KIPO (Korean Intellectual Property Office), the disclosure of which is incorporated herein entirely by reference. Further, this application is the National Stage application of International Application No. PCT/KR2016/012855, filed Nov. 9, 2016, which designates the United States and was published in Korean. Each of these applications is hereby incorporated by reference in their entirety into the present application.

TECHNICAL FIELD

The present disclosure relates to a member management method, and more particularly, to an integrated member management method, and still more particularly, to an integrated membership management method for a plurality of businesses requiring membership management, such as a fitness center, a tutoring institute, and the like.

BACKGROUND ART

Recently, there has been a surge in the number of students and workers signing up to sports facilities or tutoring institutes and the like, such as a fitness center or a foreign language tutoring institute, for personal health care or self-development, and the like.

The fitness center or tutoring institute, and the like issue membership cards to individual members, which enable information confirmation electronically for member identification and attendance management for each of the registered members. That is, when a member arrives at a fitness center or tutoring institute, he/she must carry a membership card issued to him/her because he/she has to have the membership card read by a card reader upon entering the fitness center or tutoring institute to check the member identification and attendance.

The attendance management system of Korean Patent Publication No. 10-2004-0010809 exemplifies a configuration for performing attendance management by issuing such a plastic membership card.

Such conventional member identification and attendance management methods have various drawbacks as follows.

First, it is inconvenient for members, who need to enter each business, to have a membership card previously issued by the corresponding business. For example, there are inconveniences in that, if a member of a certain business needs to visit the business spontaneously but does not carry a membership card with him/her, the member has to go and come back with his/her membership card, or when the member without holding the membership card have to explain to the management staff about he/she does not have the card at the moment.

Next, there are inconveniences in that the member must carry all of the multiple membership cards issued by each business as the member signed up to multiple businesses, such as a fitness center, yoga studio, cooking class, foreign language tutoring institute, and the like. When a member keeps a plurality of membership cards in his wallet, the wallet becomes heavy, which makes it inconvenient to carry, and when it is difficult to keep multiple cards in one wallet, the member may have to purchase additional wallet for storing only the card, which may cause unnecessary expenses.

Next, for the perspective of the manager of the business, who has to manage members, it is a cause of costs, for example, since a large number of cards must be prepared in advance for the issuance of a card for a large number of members, and there also is a disadvantage that an incidental problem occurs, such as resource consumption and environmental pollution due to card production.

DISCLOSURE OF THE INVENTION

Technical Problem

It is an objective of the present disclosure to provide an integrated membership management method.

Technical Solution

In order to achieve the above objectives of the present disclosure, an integrated membership management method is provided, which may include: at a member terminal, receiving member information about at least one business to sign up, and unique information of a member for attendance check to the business, and transmitting the received information to a central management server; at the central management server, receiving the member information and the unique information and registering the received information; at the member terminal or a business terminal, generating an attendance check request including the unique information of the member and the attendance check information of a business selected by the member from among the at least one business, and transmitting the attendance check request to the central management server; and at the central management server, receiving the attendance check request and parsing the same, performing member certification of the member using the unique information of the member, and performing attendance check certification of the member using the attendance check information.

The attendance check information may be configured as a security code.

In the above example, the generating the attendance check request including the unique information of the member and the attendance check information of the business and transmitting the attendance check request to the central management server at the member terminal or the business terminal may include: at the member terminal, receiving, by the member, the security code provided by the business, generating an attendance check request including the security code, and transmitting the attendance check request to the central management server; and when the business terminal receives and displays in real time a security code that is changed in real time at a predetermined time interval from the central management server, at the member terminal, receiving, by the member, the displayed security code, generating an attendance check request including the received security code, and transmitting the attendance check request to the central management server.

Further, the operation at the central management server of receiving the attendance check request and parsing the same, performing member certification of the member using the unique information of the member, and performing attendance check certification of the member using the attendance check information may include at the central management server, performing the attendance check certification by comparing the security code included in the attendance check request with the security code that is changed in real time.

Meanwhile, the attendance check information may be configured as a barcode.

In the above example, the generating the attendance check request including the unique information of the member and the attendance check information of the business and transmitting the attendance check request to the central management server at the member terminal or the business terminal may include at the member terminal, receiving and displaying the barcode from the central management server, and at the business terminal, reading the displayed barcode, generating an attendance check request including the reading result, and transmitting the attendance check request to the central management server.

Further, the operation at the central management server of receiving the attendance check request and parsing the same, performing member certification of the member using the unique information of the member, and performing attendance check certification of the member using the attendance check information may include at the central management server, performing the attendance check certification by comparing the barcode included in the attendance check request with the barcode.

On the other hand, the attendance check information may be configured as ID information of a Wi-Fi access point (AP) of the business.

In the above example, the generating the attendance check request including the unique information of the member and the attendance check information of the business and transmitting the attendance check request to the central management server at the member terminal or the business terminal may include at the member terminal, accessing the Wi-Fi AP, generating an attendance check request including an ID of the Wi-Fi AP, and transmitting the attendance check request to the central management server.

Further, the operation at the central management server of receiving the attendance check request and parsing the same, performing member certification of the member using the unique information of the member, and performing attendance check certification of the member using the attendance check information may include at the central management server, performing the attendance check certification by comparing the ID of the Wi-Fi AP included in the attendance check request with the ID of the Wi-Fi AP for each the business registered in advance in the central management server.

Advantageous Effects

The present disclosure gives the following effects. Since the integrated membership management method described above is configured to allow a business to perform member certification and attendance check more conveniently using a terminal possessed by the member, there is an effect that member certification and attendance check may be performed more conveniently without requiring the member to be issued a separate plastic membership card for each business or to carry all plastic membership cards in the wallet.

Since the attendance check of all the various businesses may be managed through a single central management server, there is an effect that the member may easily manage the membership of all the businesses with only one ID and password.

In addition, since the real-time change security code, the real-time change barcode, and the ID of the Wi-Fi AP in the business provided through the business is configured to be utilized in the certification process, there is an effect that the reliability as to whether or not the member actually visits the business may be increased.

MODE FOR CARRYING OUT THE INVENTION

An integrated membership management method comprises: at a member terminal, receiving member information about at least one business to sign up, and unique information of a member for attendance check to the business, and transmitting the received information to a central management server; at the central management server, receiving the member information and the unique information and registering the received information; at the member terminal or a business terminal, generating an attendance check request including the unique information of the member and the attendance check information of a business selected by the member from among the at least one business, and transmitting the attendance check request to the central management server; and at the central management server, receiving the attendance check request and parsing the same, performing member certification of the member using the unique information of the member, and performing attendance check certification of the member using the attendance check information.

Hereinafter, preferred embodiments according to the present disclosure will be described in detail with reference to the accompanying drawings.

Figure 1:
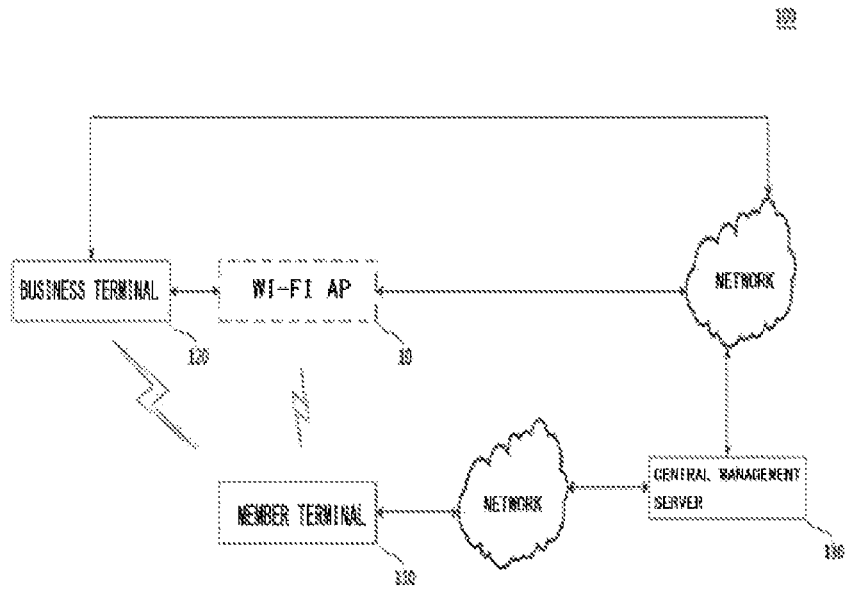
FIG. 1 is a block diagram illustrating an integrated member management system according to an embodiment of the present disclosure.
Figure 2:
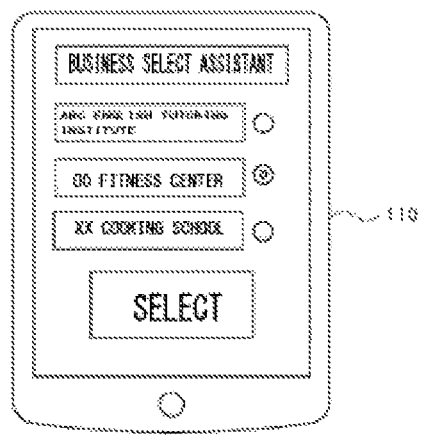
FIG. 2 illustrates a screen of a member terminal for selecting a business according to an exemplary embodiment of the present disclosure.
Figure 3:
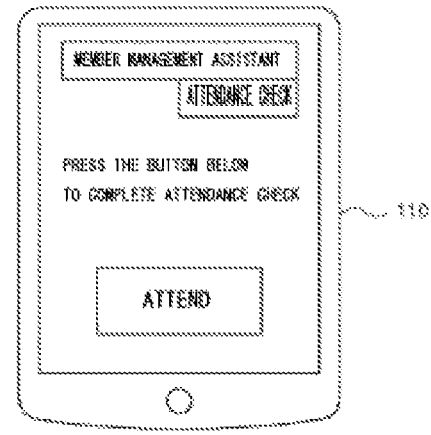
FIG. 3 illustrates a screen of a member terminal showing an attendance check request according to an embodiment of the present disclosure.

FIG. 1 is a block diagram illustrating an integrated member management system according to an embodiment of the present disclosure, FIG. 2 illustrates a screen of a member terminal for selecting a business according to an exemplary embodiment of the present disclosure, and FIG. 3 illustrates a screen of a member terminal showing an attendance check request according to an embodiment of the present disclosure.

First, referring to FIG. 1, an integrated member management system 100 according to an exemplary embodiment of the present disclosure may be configured to include a terminal owned by a member ('member terminal 110'), a terminal owned by a business ('business terminal 120'), and a central management server 130.

The integrated member management system 100 is configured to perform member certification and student certification for a fitness center, a foreign language tutoring institute, a school classroom, and the like more conveniently, and based on the same, perform attendance check more conveniently with increased reliability.

The integrated membership management system 100 is configured to allow member certification, student certification, and attendance check of all businesses using only a mobile phone that is always carried around by a member or a student, without requiring the member or student to carry a plastic membership card issued directly at various businesses such as a fitness center, or a foreign language tutoring institute, or a student ID card issued by a school.

In addition, the integrated membership management system 100 is configured not only to check the attendance, but also the time of leaving the business, thus checking exactly how long the member has stayed there or whether the student has been at the class until it finished.

Hereinafter, the configuration will be described in detail below.

The member terminal 110 may be configured as a mobile phone, a smartphone, or a tablet PC of a member. In addition, the member terminal 110 may also be configured as a PC or a portable notebook PC.

The member terminal 110 may be configured as a terminal capable of mobile communication or local area communication.

An application for integrated member management may be installed in the member terminal 110. The member terminal 110 may access the central management server 130 to download the integrated member management application and be installed with the integrated member management application.

Members may be issued an integrated identification (ID) and password upon signing up.

A member may be enabled to register not only a business such as a fitness center or a foreign language tutoring institute that he or she signed up offline, but also a workplace where he/she does a part-time job, a school, and the like, through an integrated member management site or an integrated member management application. The central management server 130 may be configured to verify the member through the business terminal 120 of a business such as a fitness center, a foreign language tutoring institute, a workplace, a school, and the like.

The member may be allowed to register in advance the unique information of his/her member terminal 110 such as a telephone number or email address to the central management server 130 when he/she signs up, for example.

When the member visits the business, the member, as always, would be carrying the member terminal 110, and accordingly, the member may input the ID/PW into the integrated member management application and access the central management server 130. At this time, on the screen as shown in FIG. 2, the member may select one of the businesses that the member is signed up, to check attendance. An attendance check screen of the business selected by the member may be displayed as shown in FIG. 3. The member terminal 110 may be configured to transmit an attendance check request to the central management server 130 immediately with the member simply pressing the button for requesting attendance check on this screen.

The member terminal 110 may be configured to automatically include the previously registered phone number or e-mail address before transmitting the attendance check request.

The business terminal 120 is a terminal provided in each business such as a fitness center or a foreign language tutoring institute and is configured for the business to perform membership management or check attendance.

The business terminal 120 may be configured to receive from the member terminal 110 an attendance check request including unique information of a member present at the business and transmit the attendance check request to the central management server 130 over the network.

The attendance check request may be transmitted from the member terminal 110, or the attendance check request may be transmitted from the business terminal 120, depending on the attendance check process of the present disclosure.

The central management server 130 may be configured to receive the attendance check request from the member terminal 110 or the business terminal 120 and parse the unique information included in the attendance check request.

A separate database of the central management server 130 may store the unique information of the member registered in advance by the member terminal 110 upon signing up.

The central management server 130 may be configured to verify whether the member matches or not, by comparing the unique information received from the member terminal 110 or the business terminal 120 with the previously registered unique information.

In addition, the central management server 130 may be configured to perform attendance check certification of the members through the process described below.

According to some embodiments of the present disclosure, a security code, a barcode, or an ID of a Wi-Fi access point (AP) 10 may be used as attendance check information for the attendance check certification.

In a first embodiment, a security code may be used as the attendance check information.

First, the central management server 130 may generate a security code that is changed in real time at predetermined time intervals and automatically transmit in real time the security code to the business terminal 120 of each business.

The security code may be a code composed of numbers or a combination of numbers, alphabets, symbols, and the like. Without limitations, the form or combination of security codes may be changeable by unit of hour, minute, and the like, or changeable differently for each member or for each business.

The business terminal 120 may be configured to receive the security code and display the same through the display, and to automatically transmit the security code to the member terminal 110 through the beacon signal or the near field communication (NFC) as needed.

The member terminal 110 may be configured to directly input the security code of the display to the integrated member management application or receive the security code of the display through the beacon signal or NFC and automatically input the same.

The member terminal 110 may be configured to include the security code together with the unique information in the attendance check request and transmit the security code to the central management server 130 in real time, when the user presses the attendance check button. The central management server 130 may be configured to verify the attendance of the corresponding member, by comparing the security code for each business transmitted in real time from the central management server 130 with the security code received in real time from the member terminal 110.

The security code may be confirmed only when a member is present at the business, thus ensuring the reliability of the attendance check. However, in the case of the display, for example, there is a possibility that the security code is exposed to a third party and use of the beacon signal with the distance limit, or the reception of security code by NFC can further ensure reliability.

When the security code is inputted by the beacon signal or the NFC, the security code may be automatically inputted to the integrated member management application, but desirably kept from being displayed.

In a second embodiment of the present disclosure, a method of using barcodes as attendance check information is provided.

The central management server 130 may be configured to generate the barcode in real time and transmit it to the member terminal 110, when the member presses the attendance check button on the member terminal 110. The member terminal 110 may be configured to receive the barcode and display the same on a display.

The member has the barcode displayed on the member terminal 110 be read by the barcode reader at the business terminal 120. The business terminal 120 may be configured to transmit the resultant reading to the central management server 130 immediately with the business terminal 120 reading the barcode through the barcode reader.

Since the barcode reading is performed by the barcode reader only when the member himself/herself is present at the business, reliability of the attendance check certification is ensured.

In this example, the barcode may be configured to include member information, business information, reading time, and the like to allow the result of barcode reading to be directly recorded and stored in the attendance check result.

In a third embodiment of the present disclosure, the ID of the Wi-Fi AP may be used as attendance check information.

First, the central management server 130 may be configured to be registered with the ID of the Wi-Fi-AP 10 provided at the business through the certification of the business terminal 120 during signing up of the member terminal 110.

The Wi-Fi-AP 10 of the business is configured for Wi-Fi local area communication, and the ID of the Wi-Fi-AP 10 is unique information of the business. Preferably, the information such as the location information, the MAC address, and the IP address of the Wi-Fi AP 10 as well as the ID of the Wi-Fi-AP 10 may be further registered. Since MAC address is unique information of hardware and thus there is no other, it plays a great role in enhancing the reliability of attendance check certification. In addition, the location information may be used to confirm whether the location information matches with the location information of the business, and thus, is one of important information that may enhance the reliability of the attendance check certification.

As the member visits the business, the member terminal 110 automatically accesses the Wi-Fi-AP 10 at the business. The integrated member management application installed in the member terminal 110 may be configured to read various information such as the ID of the Wi-Fi AP 10, location information, IP address, and MAC address from the Wi-Fi signal. In this example, the Wi-Fi-AP 10 should be configured to transmit a MAC address, location information, and the like carried on a Wi-Fi signal.

The member terminal 110 may be configured to include information of the read Wi-Fi-AP 10 into the attendance check request together with the unique information of the member and transmit it to the central management server 130.

The central management server 130 may be configured to parse the attendance check request and compare information such as the ID of the Wi-Fi-AP 10 with the previously registered information of the Wi-Fi-AP 10 for each business, to determine whether the information matches or not.

The central management server 130 may be configured to verify the attendance of the member when the information of the Wi-Fi-AP 10 matches.

Meanwhile, the central management server 130 may be configured to record and store attendance check for each business the member has signed up. The business terminal 120 may be configured to check a history of the attendance check of the corresponding business stored in the central management server 130.

Of course, the first to third embodiments described above may be used to verify not only the attendance time but also the time of leaving the business. In an exemplary configuration, the member who is about to leave may send an exit check request to the central management server 130 by pressing an exit check button on the integrated member management application and the central management server 130 may perform exit check certification in the same manner described above.

This exit check certification may allow the members to verify how long they have been at the business.

For example, the exit check certification may be utilized as course certification data or working hour certification data based on the certification described above as to whether the members have been at the class until it finishes, or how many hours a part-time worker has worked on a business, and the like.

As described above, according to embodiments of the present disclosure, increased convenience is provided, since users can use a smartphone to easily perform member certification as well as attendance certification, instead of carrying a plastic membership card individually.

Figure 4:
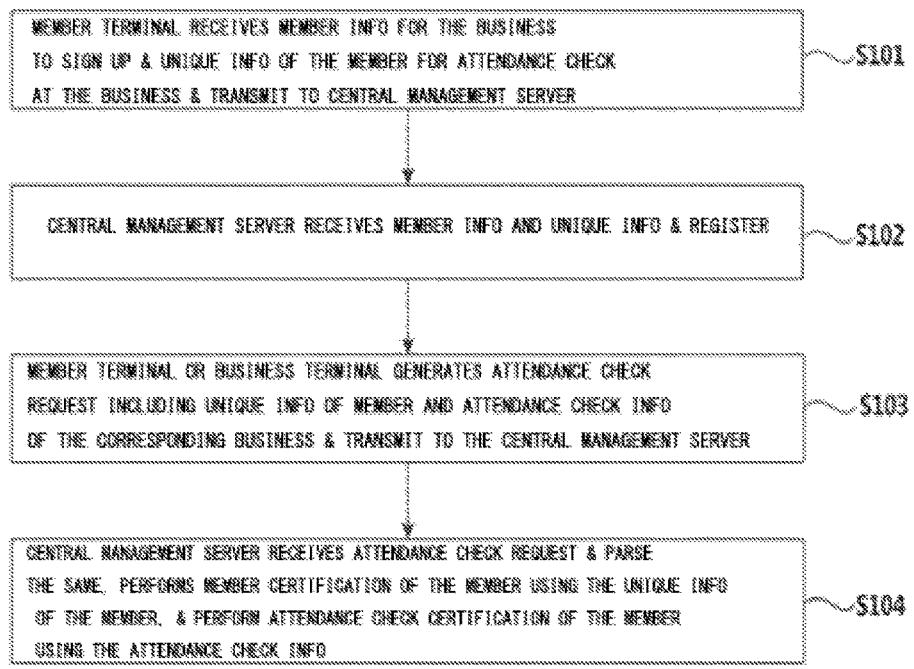
FIG. 4 is a flowchart illustrating an integrated membership management method according to an embodiment of the present disclosure.

FIG. 4 is a flowchart illustrating an integrated membership management method according to an embodiment of the present disclosure.

Referring to FIG. 4, the member terminal 110 receives member information about a business that the member terminal 110 intends to sign up and unique information of a member for attendance check to the business and transmits the information to the central management server 130, at S101.

In this example, the 'member information' means various information necessary for signing up, including the member name, and the 'unique information' of the member may correspond to a mobile phone number or an e-mail address that can identify the member.

Next, the central management server 130 receives and registers the member information and the unique information, at S102. The central management server 130 may be configured to not only register membership information and unique information for each member, but also register and manage member information and unique information for each business.

Next, the member terminal 110 or the business terminal 120 generates an attendance check request including the unique information of the member and attendance check information of the business and transmits the attendance check request to the central management server 130, at S103.

It would be understood that in the first embodiment, the attendance check information may be configured as a security code.

In the first embodiment, the central management server 130 may be configured to generate the security code and transmit it to the member terminal 110, when the attendance check button on the member terminal 110 is pressed. In an example, the security code may be configured to be changed and generated in real time by the central management server 130 at predetermined time intervals. The security code may be composed of a combination of numbers, alphabets, and symbols, and the like, and not limited to any specific format. In an example, it is preferable that the security code is screened such that the member may not see and confirm it on the member terminal 110. This is in consideration of a concern that the member may send or inform the security code to other members.

The member terminal 110 may be configured to receive the security code and generate an attendance check request that includes the security code and the unique information of the member. At this time, the attendance check request may be transmitted to the central management server 130 by the member terminal 110.

The series of processes described above are successively performed with the member pressing the attendance check button once on the display of the member terminal 110. The member may be required to simply press the button on his/her smartphone when he/she arrives at the business, according to which the processes for attendance check will automatically follow.

Another aspect according to the first embodiment may be configured as follows.

First, the business terminal 120 may be configured to receive the security code from the central management server 130 and display it in real time. The security code may be displayed on the display of the business terminal 120 or on a separate display device (not shown).

At this time, in an exemplary configuration, when the security code is displayed at the business, the member may input the security code on the display to the member terminal 110, and the member terminal 110 may generates an attendance check request including the received security code and transmit the attendance check request to the central management server 130.

In the second embodiment, the attendance check information may be configured as a barcode.

In the second embodiment, when the attendance check button of the member terminal 110 is pressed, the member terminal 110 may be connected to the central management server 130, and the central management server 130 may transmit a predetermined fixed barcode to the member terminal 110 or generate a barcode in real time and transmit it to the member terminal 110. In an exemplary configuration, the member terminal 110 may receive and display a barcode, and the business terminal 120 may read the barcode using a barcode reader. The business terminal 120 may be configured to generate an attendance check request including a result of reading the barcode and transmit the attendance check request to the central management server 130.

In the third embodiment, attendance check information may be configured as ID information of a Wi-Fi access point (AP) of a business.

In the third embodiment, when the member terminal 110 present at the business accesses the Wi-Fi-AP 10 at the business, the ID of the Wi-Fi AP 10, IP address, MAC address, and the like may be read from the Wi-Fi signal. In this example, the MAC address is applicable when the Wi-Fi-AP 10 transmits the same.

The member terminal 110 may be configured to generate an attendance check request including the information of the Wi-Fi-AP 10 and transmit the attendance check request to the central management server 130.

Next, the central management server 130 may receive the attendance check request and parse the same, perform the member certification of the member using the unique information of the member, and perform the attendance check certification of the member using the attendance check information, at S104.

In the first embodiment described above, the central management server 130 may be configured to receive an attendance check request from the member terminal 110.

Further, the central management server 130 may be configured to parse the attendance check request and read the security code included therein. The central management server 130 may be configured to perform attendance check certification by comparing the read security code with the security code that has been already transmitted from the central management server 130 to the member terminal 110 and is changed in real time. Attendance may be verified when the result of the comparison matches.

In the second embodiment, the central management server 130 may be configured to receive an attendance check request from the business terminal 120. The central management server 130 may parse the attendance check request and read the barcode included therein. The central management server 130 may be configured to perform attendance check certification by determine, by comparison, whether or not the information of the barcode previously transmitted from the central management server 130 to the member terminal 110 matches the read information of the barcode included in the attendance check request.

A separate certification code may be added to the barcode, in which case the certification function can be further enhanced with the use of matching or non-matching of the certification code.

Meanwhile, in the third embodiment described above, the central management server 130 may be configured to receive an attendance check request from the member terminal 110. In this example, the attendance check request includes the ID of the Wi-Fi AP 10 provided at the business or the other information of Wi-Fi AP 10, and the central management server 130 may be configured to read such information. Since the ID of the Wi-Fi AP 10 provided at the business and other information are registered at the central management server 130 in advance, the central management server 130 may be configured to perform the attendance check certification by determining whether the ID of the Wi-Fi-AP 10 or other information read from the attendance check request matches the previously registered information.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure is configured to more conveniently perform member certification and attendance check certification at a business using a terminal owned by a member, such that member certification and attendance check may be performed more conveniently without requiring the member to be issued a separate plastic membership card for each business or to carry all plastic membership cards in the wallet.

DESCRIPTION OF REFERENCE NUMERALS

110: business terminal
120: member terminal
130: central management server

The invention claimed is:
1. An integrated membership management method comprises:
(a) transmitting member information about at least one business to sign up, and unique information of a member for attendance check to the business received at a member terminal to a central management server;

(b) registering the member information and the unique information received at the central management server;

(c) generating an attendance check request including the unique information of the member and the attendance check information of a business selected by the member from among the at least one business at the member terminal or a business terminal, and transmitting the attendance check request to the central management server; and (d) parsing the attendance check request received at the central management server same, performing member certification of the member using the unique information of the member, and performing attendance check certification of the member using the attendance check information, wherein the attendance check information comprises a security code, wherein the step (c) comprises, at the member terminal, receiving, by the member, the security code provided by the business, generating an attendance check request including the security code, and transmitting the attendance check request to the central management server, and when the business terminal receives and displays in real time a security code that is changed in real time at a predetermined time interval from the central management server, at the member terminal, receiving, by the member, the displayed security code, generating an attendance check request including the received security code, and transmitting the attendance check request to the central management server, wherein the step (d) comprises, at the central management server, performing the attendance check certification by comparing the security code included in the attendance check request with the security code that is changed in real time.

2. An integrated membership management method comprises:

(a) transmitting member information about at least one business to sign up, and unique information of a member for attendance check to the business received at a member terminal to a central management server;

(b) registering the member information and the unique information received at the central management server;

(c) generating an attendance check request including the unique information of the member and the attendance check information of a business selected by the member from among the at least one business at the member terminal or a business terminal, and transmitting the attendance check request to the central management server; and (d) parsing the attendance check request received at the central management server same, performing member certification of the member using the unique information of the member, and performing attendance check certification of the member using the attendance check information, wherein the attendance check information comprises an identification (ID) information of a Wi-Fi access point (AP) of the business, wherein the step (c) further comprises, at the member terminal, accessing the Wi-Fi AP, generating an attendance check request including an ID of the Wi-Fi AP, and transmitting the attendance check request to the central management server, wherein the step (d) further comprises, at the central management server, performing the attendance check certification by comparing the ID of the Wi-Fi AP included in the attendance check request with the ID of the Wi-Fi AP for each the business registered in advance in the central management server.

* * * * *